United States Patent [19]
Nomura et al.

[11] Patent Number: 5,535,057

[45] Date of Patent: Jul. 9, 1996

[54] DRIVING DEVICE FOR ZOOM LENS BARREL

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 353,211

[22] Filed: Dec. 1, 1994

[30] Foreign Application Priority Data

Dec. 3, 1993 [JP] Japan .................................. 5-304142

[51] Int. Cl.⁶ .................................................. G02B 15/14
[52] U.S. Cl. ...................... 359/694; 354/400; 354/195.1
[58] Field of Search .................................... 359/694, 695, 359/696, 697, 698, 699, 700, 701, 702, 703, 704; 354/195.1, 400

[56] References Cited

U.S. PATENT DOCUMENTS

| | | | |
|---|---|---|---|
| 4,796,045 | 1/1989 | Hamanishi et al. | 354/400 |
| 4,944,030 | 7/1990 | Haraguchi et al. | 354/403 |
| 4,962,399 | 10/1990 | Numako et al. | 354/195.1 |
| 4,967,218 | 10/1990 | Numako et al. | 354/195.1 |
| 5,012,273 | 4/1991 | Nakamura et al. | 354/485 |
| 5,144,493 | 9/1992 | Nomura | 359/700 |
| 5,196,963 | 3/1993 | Sato et al. | 359/699 |
| B1 4,944,030 | 5/1993 | Haraguchi et al. | 354/403 |

*Primary Examiner*—Georgia Y. Epps
*Assistant Examiner*—Dawn-Marie Bey
*Attorney, Agent, or Firm*—Greenblum & Bernstein

[57] ABSTRACT

A driving device for a zoom lens barrel in a camera which includes a movable cylinder linearly guided in the optical axis direction, a linear groove formed on the movable cylinder, and a rotation cylinder engaging the movable cylinder. The driving device further includes a guide member which is supported on the rotation cylinder, which rotates in relation to the rotation cylinder, and which moves in the optical axis direction together with the rotation cylinder. An engaging member is formed on the guide member and engages the linear groove, a pinion is rotatably supported on the movable cylinder, and a shaft is driven to rotate by the pinion. One end of the shaft is supported on the movable cylinder and the other end of the shaft is supported on the guide member. At least one of the shaft ends is supported to be slidable in a direction parallel to the optical axis, and a second pinion for transmitting driving force to the rotation cylinder. The second pinion fits on the shaft to be slidable relative to the shaft in an axial direction of the shaft. The second pinion is supported on the guide member in the vicinity of the engaging member. A lens group of the zoom lens is moved in the optical axis direction by rotation of the second pinion to change a focal length of the zoom lens.

8 Claims, 8 Drawing Sheets

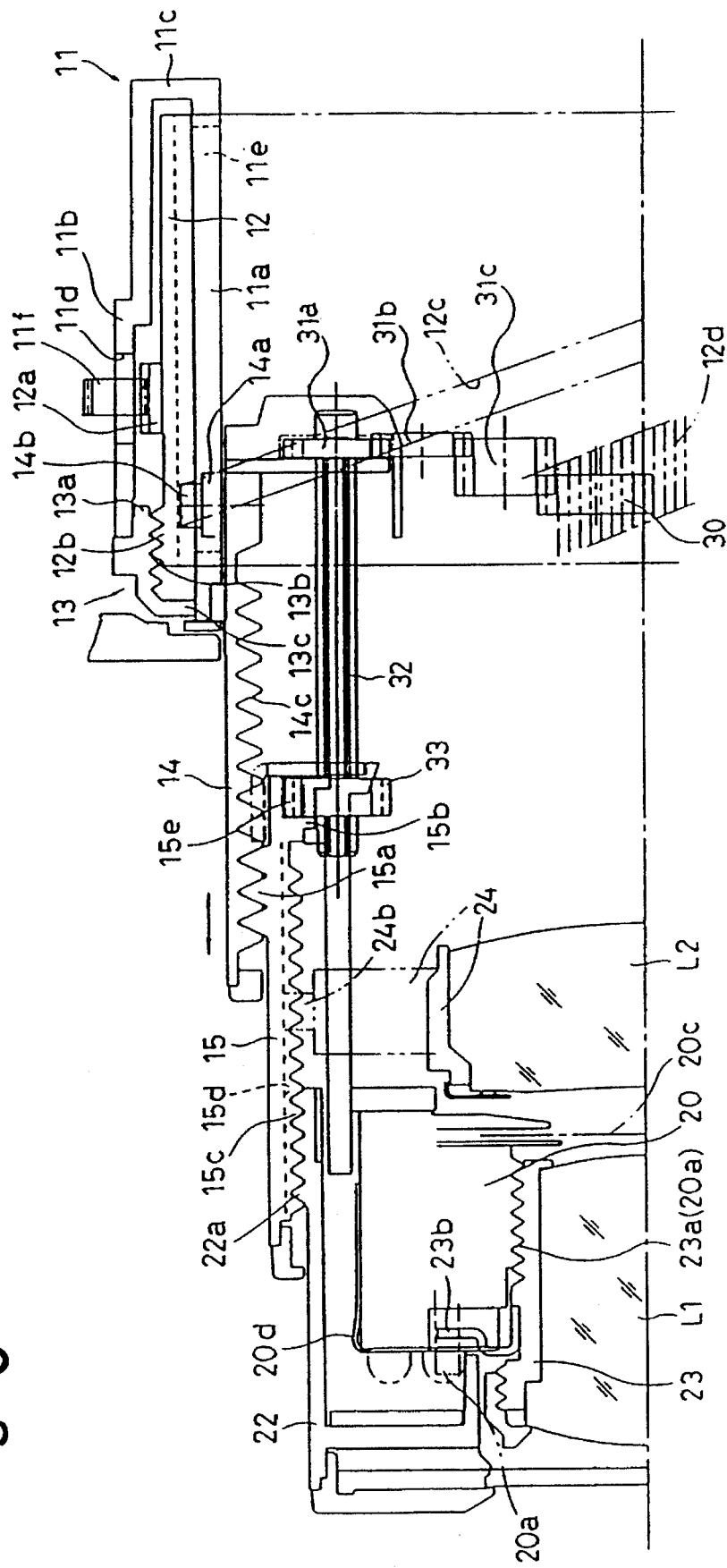

DRIVING DEVICE FOR ZOOM LENS BARREL

BACKGROUND OF THE INVENTION

1. Field of the Invention

The present invention relates to a driving device for a zoom lens barrel in a camera.

2. Description of the Related Art

A zoom lens barrel of a camera is often provided with various types of rotational cylinders to carry out zooming or focusing operation. In the lens barrel which the applicant has been developing, a driving force is transmitted to a rotation cylinder engaging the inner wall of a movable lens barrel to cause the rotation cylinder to move forward and backward in a direction of an optical axis through a rotation shaft in the movable lens barrel which is linearly guided in a direction parallel to the optical axis and a pinion which slidably fits on the rotation shaft in an axial direction of the shaft. However, since the pinion is movably supported on the shaft and moves in accordance with the movement of the rotation cylinder in the optical axis direction, it is difficult to support both end portions (front end and rear end) of the shaft by a common member or members which do not have a relative movement therebetween due to limited space. If the rotation shaft is unstably supported, there will likely be a loss in efficiency of the pinion for transmitting rotation.

SUMMARY OF THE INVENTION

It is therefore an object of the present invention to provide a driving device for a zoom lens barrel wherein the driving force is transmitted to a rotation cylinder engaging the inner wall of a movable lens barrel through a rotation shaft in the movable lens barrel and a pinion movably supported on the rotation shaft in the axial direction of the shaft. In the present invention, the rotation shaft is securely supported, which prevents a decrease in the transmitting efficiency of the driving force used by the pinion which is supported on the rotation shaft.

According to one aspect of the present invention, there is provided a driving device for a zoom lens barrel. The driving device includes a movable cylinder linearly guided in the direction of an optical axis of a zoom lens, a linear guide formed on the movable cylinder and extending in a direction parallel to the optical axis and a rotation cylinder engaging the movable cylinder. A guide member which is supported on the rotation cylinder, rotates in relation to the rotation cylinder and moves in the optical axis direction together with the rotation cylinder. An engaging member is formed on the guide member and engages the linear guide of the movable cylinder, a pinion is rotatably supported on the movable cylinder and a shaft is driven to rotate by the pinion. Thus, one end of the shaft is supported on the movable cylinder and the other end of the shaft is supported on the guide member, at least the one end or the other end being supported in a slidable manner in a direction parallel to the optical axis. A second pinion is provided for transmitting driving force to the rotation cylinder, wherein the second pinion fits on the shaft in a slidable manner in relation to the shaft, in an axial direction of the shaft, the second pinion being rotatably supported on the guide member. Thus, the second pinion is supported on the guide member in the vicinity of the engaging member, and a lens group of the zoom lens is moved in the optical axis direction by rotation of the second pinion to change a focal length of the zoom lens.

According to another aspect of the present invention, there is provided a driving device for a zoom lens barrel. The driving device includes a movable cylinder linearly moving in a direction of an optical axis of a zoom lens and provided with a linear guide groove, a rotation cylinder rotatably fitted in the movable cylinder and provided with a circumferential gear, a movable member linearly moving in the optical axis direction and provided with a key engaging the linear guide groove, and a pinion rotatably supported on the movable cylinder. A rotation transmitting shaft is provided for transmitting the rotation thereof to the pinion, with the pinion engaging the circumferential gear. Thus, the pinion is supported in the vicinity of the key.

According to another aspect of the present invention, there is provided a driving device for a zoom lens barrel. The driving device includes a first cylinder linearly movable in the direction of an optical axis of a zoom lens without rotating and having a linear guide groove formed on an inner periphery of the first cylinder and extending in a direction parallel to the optical axis. A second cylinder engages the first cylinder through helicoid gears in a rotatable manner with respect to the first cylinder, a guide member which is supported on an inner periphery of the second cylinder, rotates with respect to the second cylinder and moves in the optical axis direction together with the second cylinder. An engaging member is formed on the guide member and engages the linear guide groove, a pinion rotatably supported on the first cylinder, and a shaft is driven to rotate through the pinion. Thus one end of the shaft is fixed to the pinion, and the shaft is supported on the guide member with the guide member slidable on the shaft in an axial direction of the shaft. A second pinion is provided for transmitting driving force to the rotation cylinder, wherein the second pinion fits on the shaft in a slidable manner with respect to the shaft in an axial direction of the shaft and rotates together with the shaft, the second pinion rotatably supported on the guide member in the vicinity of the engaging member.

The present disclosure relates to subject matter contained in Japanese patent application No. 5-304142 (filed on Dec. 3, 1993) which is expressly incorporated herein by reference in its entirety.

BRIEF DESCRIPTION OF THE DRAWINGS

The present invention will be more apparent from the following description with reference to the accompanying drawings.

DETAILED DESCRIPTION OF PREFERRED EMBODIMENTS

Figure 1:
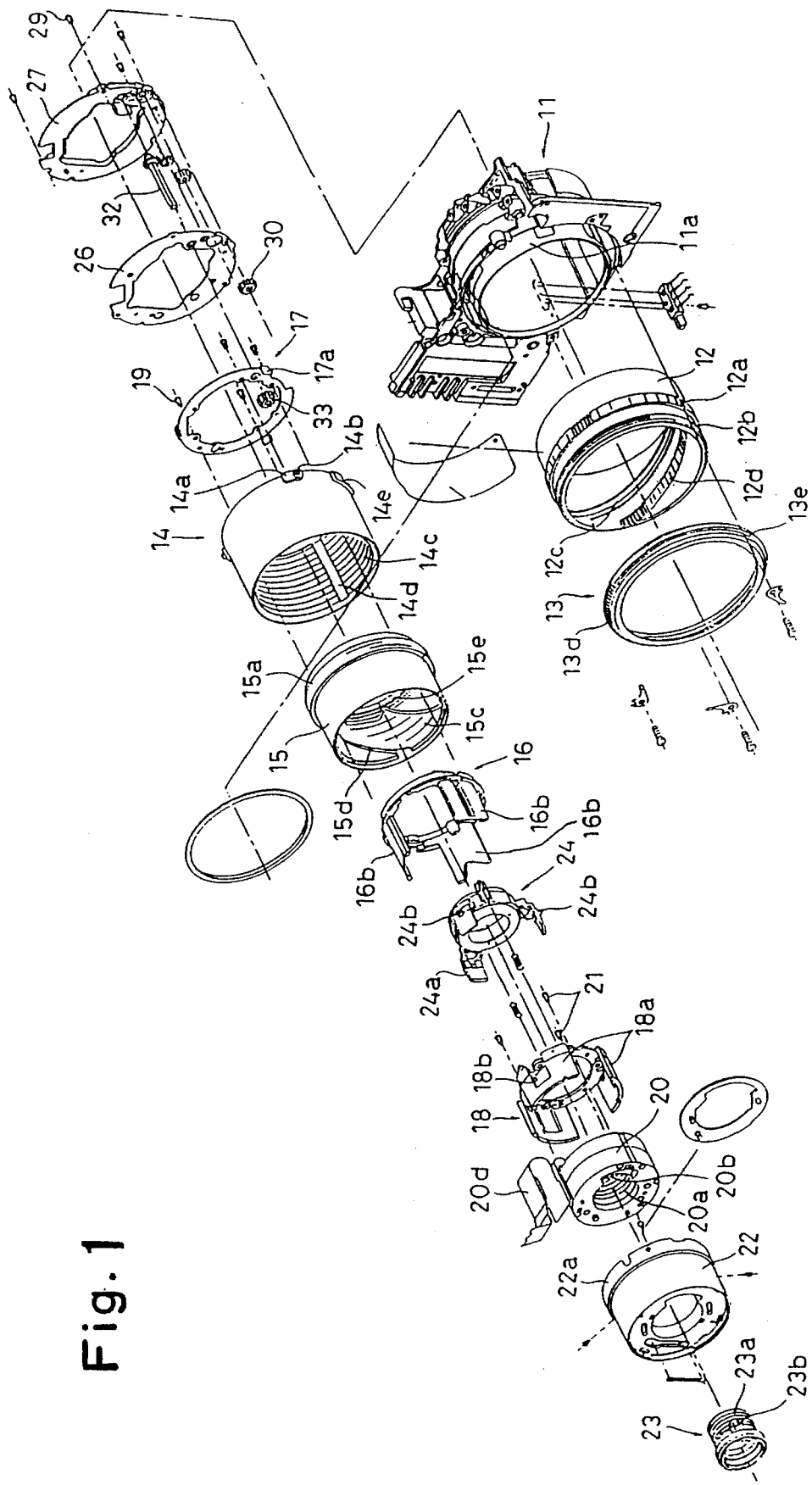
FIG. 1 is an exploded isometric view of a lens barrel according to an embodiment of the present invention.

In this embodiment, a zoom lens optical system includes a front lens group L1 and a rear lens group L2. A focusing operation is carried out by the movement of the front lens group L1 as it travels in the optical axis direction of the zoom lens system.

A fixed lens barrel 11 is integrally formed with the camera body and is provided with an inner cylinder 11a and an outer cylinder 11b. The rear ends of the inner cylinder 11a and the outer cylinder 11b are connected to each other through a connecting wall 11c, and the front ends of the cylinders 11a and 11b are opened. A rotational ring or cylinder 12, which is inserted from the open end of the cylinders 11a and 11b, is rotatably mounted on the outer periphery of the inner cylinder 11a. Three straight guide grooves 11e, each extending in a direction parallel to the optical axis, are formed on the inner cylinder 11a. Only one of the straight guide grooves 11e is shown in FIG. 8.

Figure 2:
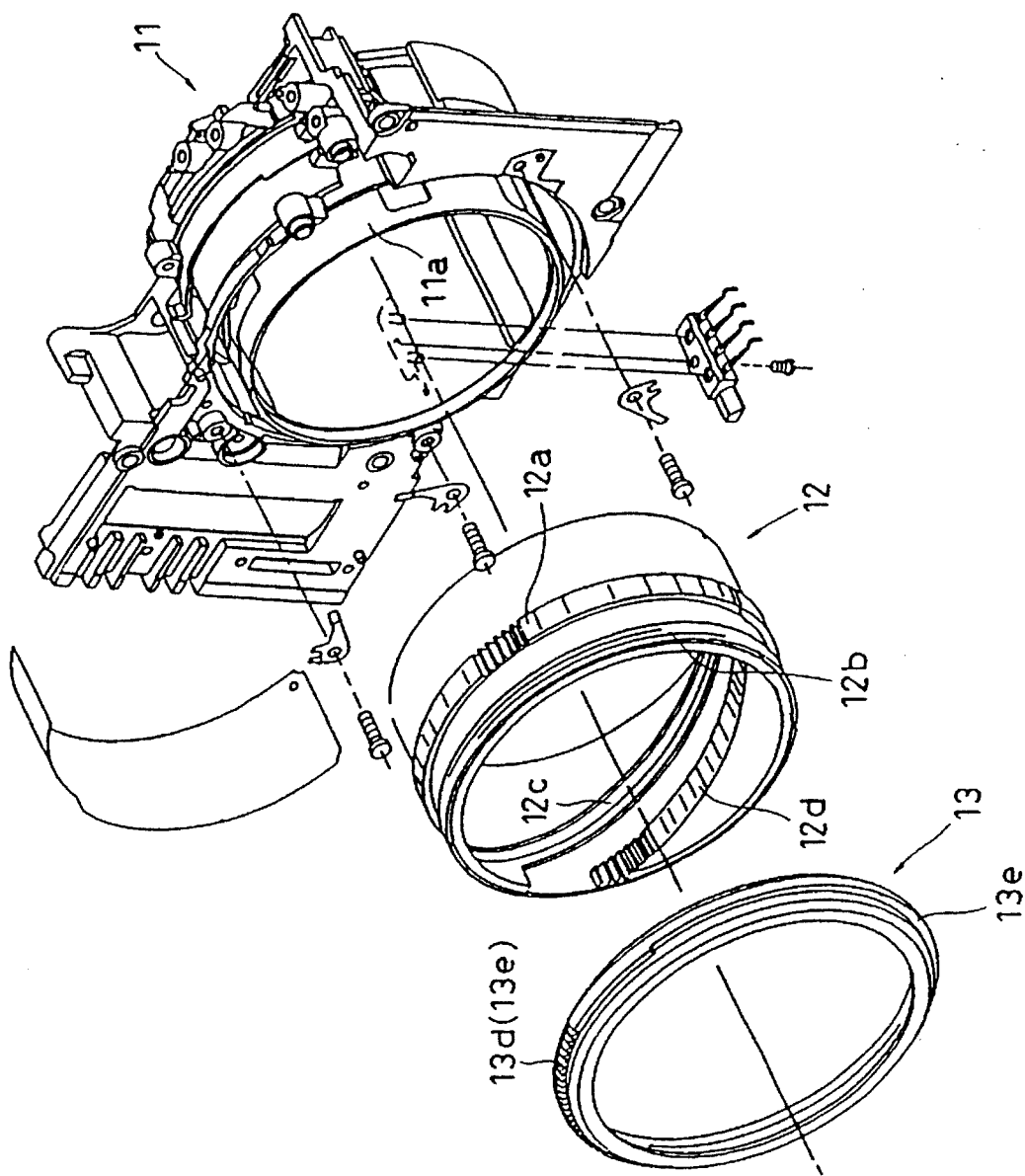
FIG. 2 is an enlarged isometric view of the rear portion of the lens barrel shown in FIG. 1.

A spur gear 12a is integrally formed with the rotational ring 12 on an outer periphery thereof and a fine thread 12b is integrally formed with the rotational ring 12 at a tip of the outer peripheral portion thereof. On the inner wall of the rotational ring 12 three lead grooves 12c are formed parallel to one another and each is inclined with respect to to the circumferential direction of the rotational ring 12. An inclined inner gear 12d is provided on the inner wall of the ring 12 and extends parallel to the lead grooves 12c. Only one of the three lead grooves 12c is shown in FIGS. 2 and 8.

A support ring 13 is secured to the front open end of the inner cylinder 11a and outer cylinder 11b of the fixed lens barrel 11. The support ring 13 includes a portion 13a engaging the inner surface of the outer cylinder 11b; a thread portion 13b engaging the fine thread 12b; a portion 13c contacting an outer surface of the inner cylinder 11a; and an outer flange 13e. The support ring 13 is biased toward the fixed lens barrel 11 by a spring means (not shown) and is retained at a predetermined position. Reference symbol 13d is a gear formed on an outer periphery of the support ring 13 for the adjustment of position of the rotational ring 12 in the optical axis direction. The support ring 13 also functions to strengthen the edge opening of the inner cylinder 11a and the outer cylinder 11b.

A notch 11d for allowing a pinion 11f to mesh with the spur gear 12a is provided on the outer cylinder 11b of the fixed cylinder 11, and other notches similar to the notch 11d are formed on the inner cylinder 11a to expose the lead grooves 12c and the inclined gear 12d.

Figure 3:
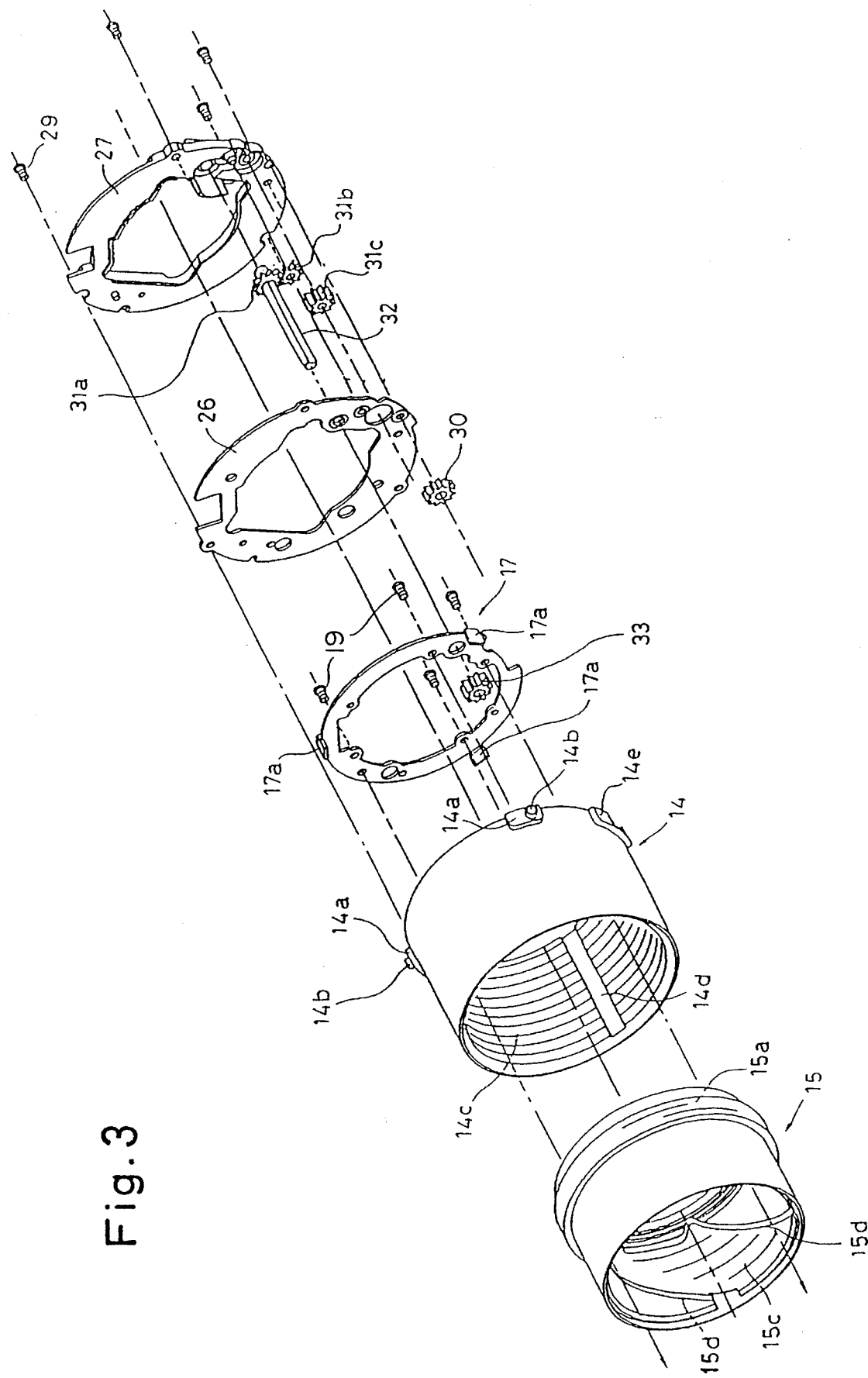
FIG. 3 is an enlarged isometric view of the intermediate portion of the lens barrel shown in FIG. 1.
Figure 4:
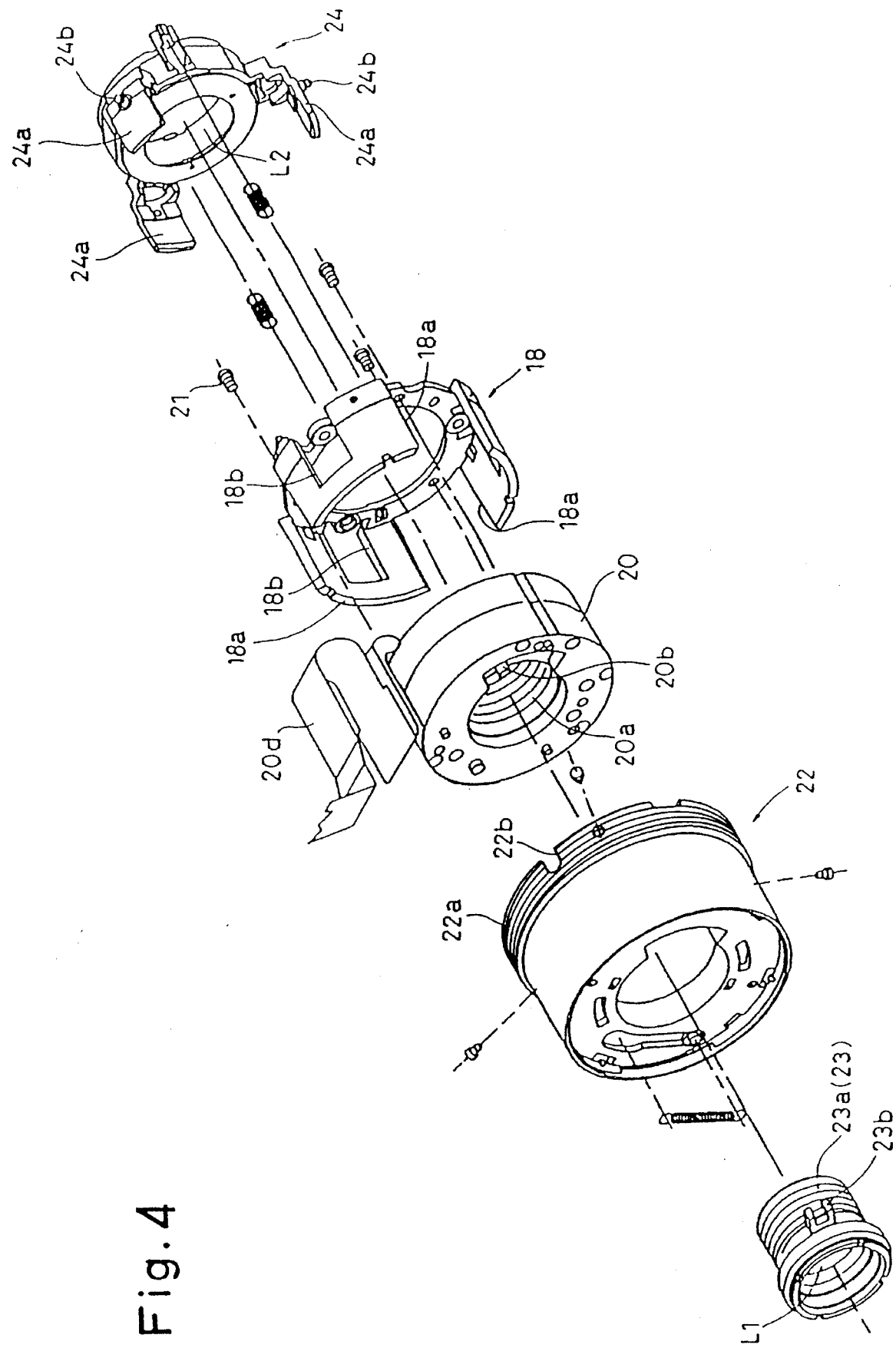
FIG. 4 is an enlarged isometric view of the front portion of the lens barrel shown in FIG. 1.

A first cylinder (i.e., movable cylinder) 14 which moves in the optical axis direction fits in the inner cylinder 11a of the fixed lens barrel 11. Three straight guide projections 14a are integrally formed with the outer periphery of the first cylinder 14 and engage the guide grooves 11e of the fixed lens barrel 11. Only one of the three straight guide projections 14a is shown in FIG. 8. A pin 14b engaging the corresponding lead groove 12c of the rotational ring 12 is formed on each of the guide projections 14a. A female helicoid 14c and three straight guide grooves (i.e., linear guide or linear guides-grooves) 14d parallel to the optical axis are formed on the inner wall of the first cylinder 14. Only one of the three straight guide grooves 14d can be seen in FIG. 3. With the construction described above, the rotation of the rotation ring 12 causes the first cylinder 14 to move in the optical axis direction without rotating by means of the guide grooves 11e and the lead grooves 12c.

Figure 7:
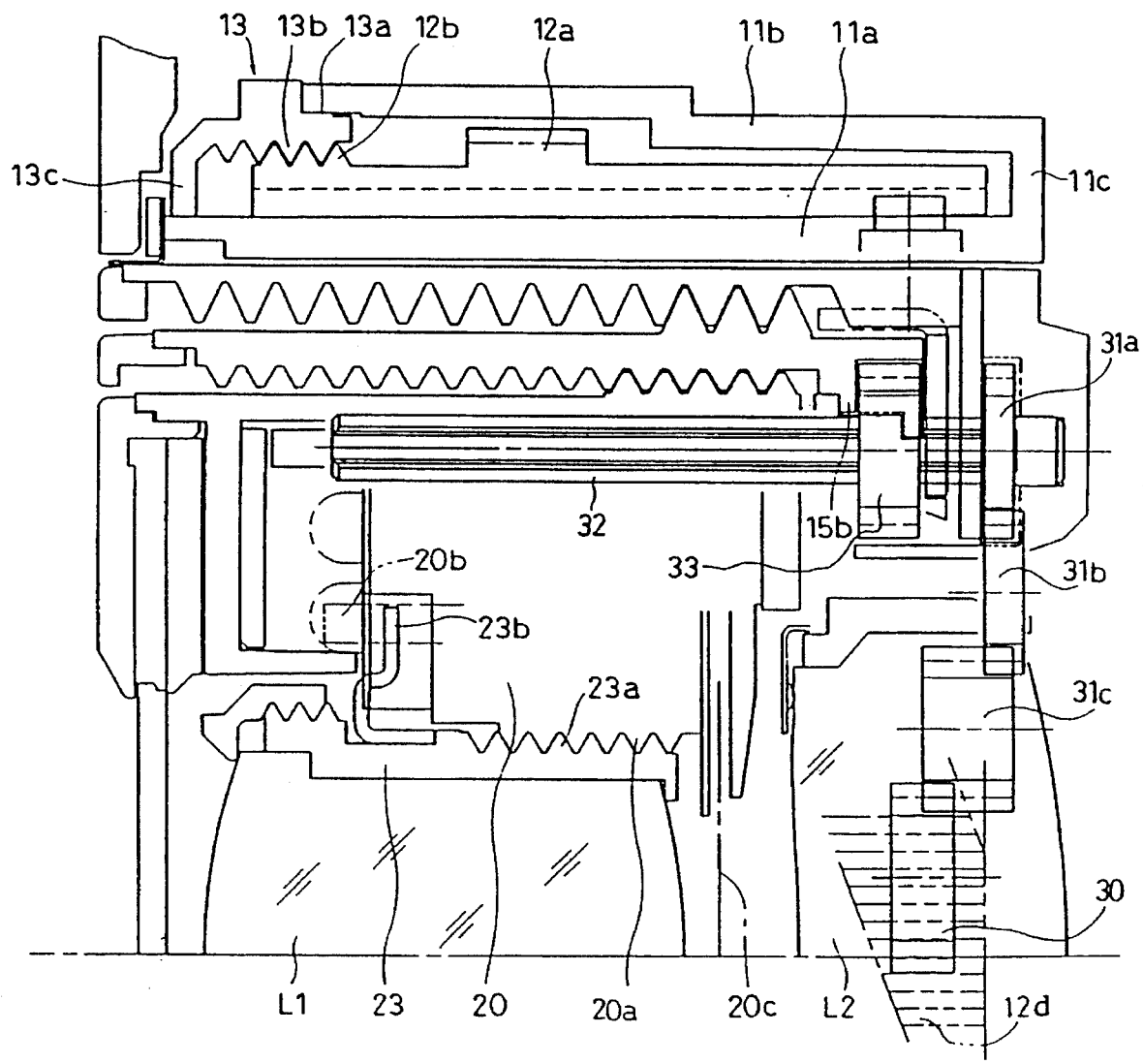
FIG. 7 is a lateral cross-sectional view of the upper half of the accommodated lens barrel according to the present invention; and, FIG. 8 is a lateral cross-sectional view of the upper half of the extended lens barrel according to the present invention.

Inside the first cylinder 14 a second cylinder (i.e., rotation cylinder) 15 is accommodated, and at a rear portion of the outer periphery of the second cylinder 15 a male helicoid 15a which engages the female helicoid 14c of the first cylinder 14 is formed. A straight guide member (i.e., guide member or movable member) 16 is situated in the second cylinder 15, and a straight guide plate 17 is fixed to a rear end portion of the guide member 16 by fastening screws 19. An inner flange 15b is integrally formed with the second cylinder 15 between the straight guide member 16 and the guide plate 17 so as to rotate in relation to the guide member 16 and the guide plate 17 as illustrated in FIGS. 7 and 8. Three straight guide keys (i.e., engaging member) 17a are formed on the periphery of the guide plate 17 and engage the guide grooves 14d of the first cylinder 14. As a result, the guide member 16 and the guide plate 17 rotate in relation to the second cylinder 15 and integrally move in the optical axis direction. In other words, the second cylinder 15 is rotatable and movable in the optical axis direction at the same time by means of the male and female helicoids 15a and 14c. Also, the guide member 16 and the guide plate 17 are movable together with the second cylinder 15 in the optical axis direction without rotating.

The guide member 16 is provided with three straight keys 16b each extending in a direction parallel to the optical axis. A guide member 18 for linearly guiding the front lens group L1 is provided with three straight keys 18a each extending in a direction parallel to the optical axis. The straight keys 18a engage the straight keys 16b. A shutter block 20 is secured to the front lens group guide member 18 through the fastening screws 21 and is further secured to the front lens group supporting cylinder 22. As a result, the shutter block 20 and the front lens group supporting cylinder 22 are prevented from rotating and are allowed to move only in the optical axis direction.

The shutter block 20 is provided on its inner periphery with a female helicoid 20a extending parallel to the optical axis, and a male helicoid 23a of a front lens frame 23 is engaged with the female helicoid 20a. The shutter block 20, as is widely known, rotates the front lens frame 23 by means of the helicoids 20a and 23a through a driving pin 20b and a projection 23b in accordance with the subject distance signals from a distance measuring device (not shown), and then the shutter block 20 moves the lens frame 23 toward a focal point. At the rear end portion of the outer periphery of the front lens group supporting cylinder 22, a male helicoid 22a is formed to move the front lens frame 23 in the optical axis direction during a zooming operation. The shutter block 20 is provided with blades 20c, which open and close in accordance with the luminance signals of the subject. Driving signals are supplied to the shutter block 20 through a flexible printed circuit board (FPC board) 20d.

A rear lens group guiding slot 18b is formed on each of the straight keys 18a of the front lens group guide member 18 for linearly moving the rear lens group L2 in the optical axis direction. The rear lens group L2 is secured to the rear lens frame 24. Three straight keys 24a engaging the rear lens group guiding slots 18b are formed on the rear lens frame 24. A cam pin 24b is formed on each of the keys 24a so as to project in a radial direction therefrom.

A female helicoid 15c and three cam grooves 15d are formed on the inner periphery of the second cylinder 15. The female helicoid 15c engages a male helicoid 22a of the front lens group supporting cylinder 22, and the cam grooves 15d engage the cam pins 24b of the rear lens frame 24. The cam grooves 15d meet with the female helicoid 15c at the same position in the circumferential direction of the second cylinder 15 such that a part of the female helicoid 15c is removed. When assembled, the cam pins 24b of the rear lens frame 24 are engaged with open grooves 22b of the front lens group supporting cylinder 22. Under this condition, the cam pins 24b are engaged with the cam grooves 15d and the male helicoid 22a is engaged with the female helicoid 15c. Under these conditions, the rotation of the second cylinder 15 causes the front lens group supporting cylinder 22 (front lens group L1) to linearly move in the optical axis direction due to the relationship between the female helicoid 15c and the male helicoid 22a and between the keys 16b of the guide member 16 and the keys 18a of the front lens group guide member 18. Further, the rotation of the second cylinder 15 causes the rear lens frame 24 (rear lens group L2) to move along a predetermined path in the optical axis direction O due to the relationships between the cam grooves 15d and the cam pins 24b and between the keys 24a of the rear lens frame 24 and the rear lens group guiding slots 18b of the front lens guide member 18 to thereby effect zooming.

As explained above, when the rotational ring 12 is driven, the first cylinder 14 linearly moves in the optical axis direction, and when the second cylinder 15 is rotated in relation to the first cylinder 14, the second cylinder 15 moves in the optical axis direction while rotating. As a result, the front lens group L1 and the rear lens group L2 linearly move while the distance between the two lens groups changes to effect zooming.

Next, a driving mechanism for the second cylinder 15 will be explained. The driving mechanism transmits the rotation of the rotation cylinder 12 to the second cylinder 15. A pair of gear supporting plates 26 and 27 are secured to the rear end portion of the first cylinder 14 through fastening screws 29. The pair of gear supporting plates 26 and 27 constitute a gear block. A pinion 30 engaging the inclined inner gear 12d of the rotational ring 12 is rotatably attached to the gear supporting plate 26. The pinion 30 is accommodated in a straight guide projection 14e having a space for the pinion therein, which is formed on a rear end of the first cylinder 14. A part of the teeth of the pinion 30 accommodated in the space 14e projects from the outer periphery of the first cylinder 14. The inclined inner gear 12d of the rotational ring 12 is parallel to the lead grooves 12c, so that the engagement between the pinion 30 and the inclined inner gear 12d is maintained even when the first cylinder 14 moves in the optical axis direction due to the rotation of the rotational ring 12. A gear train 31, including a final gear 31a and relay gears 31b and 31c, is supported between the gear supporting plates 26 and 27 to receive the rotation of the pinion 30, and a rotation transmitting shaft 32 is integrally formed with the final gear 31a. The shaft 32 has an uniform cross section which is not round.

Figure 5:
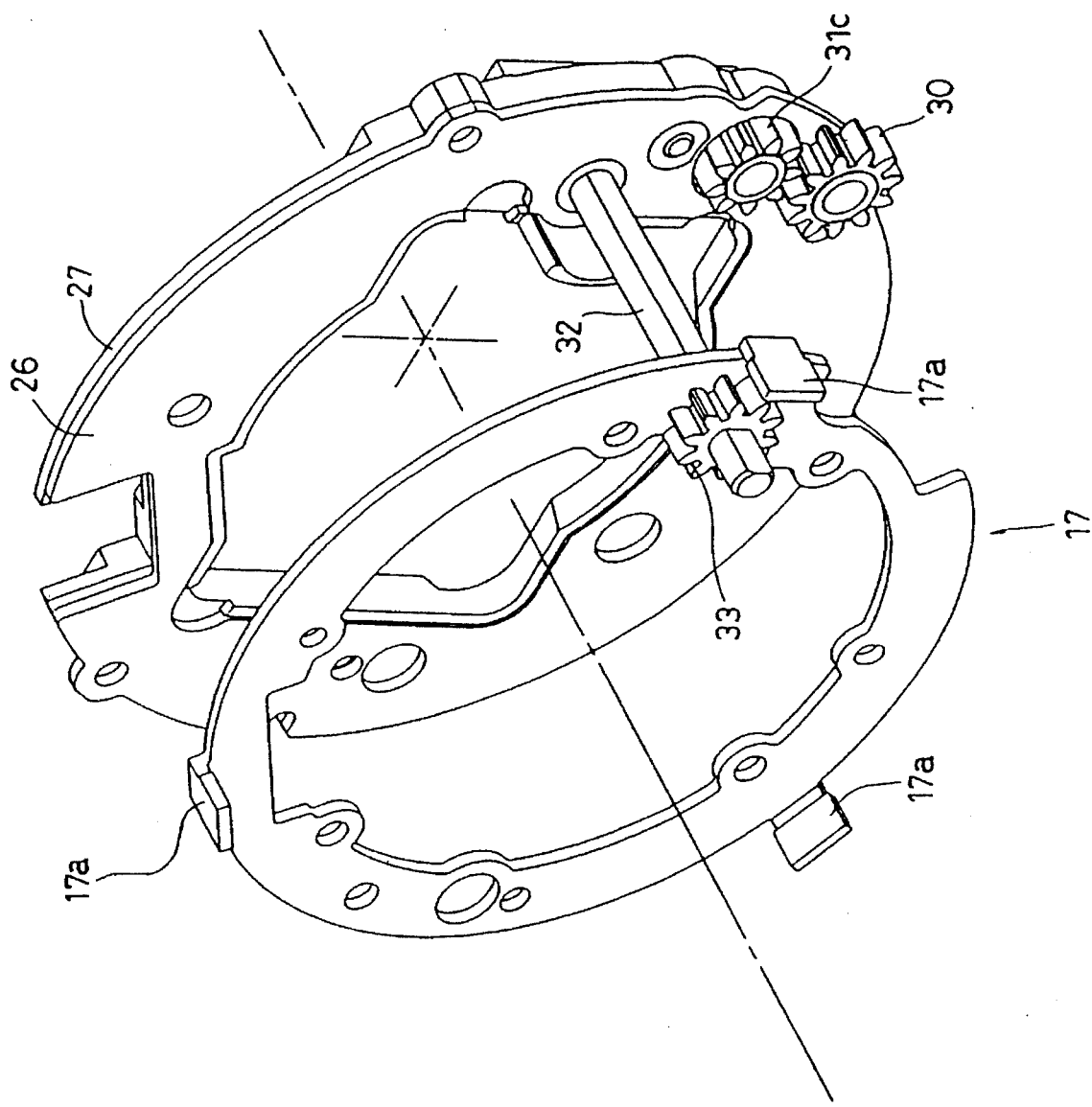
FIG. 5 is an isometric view of a supporting mechanism for a driving system of the lens barrel.
Figure 6:
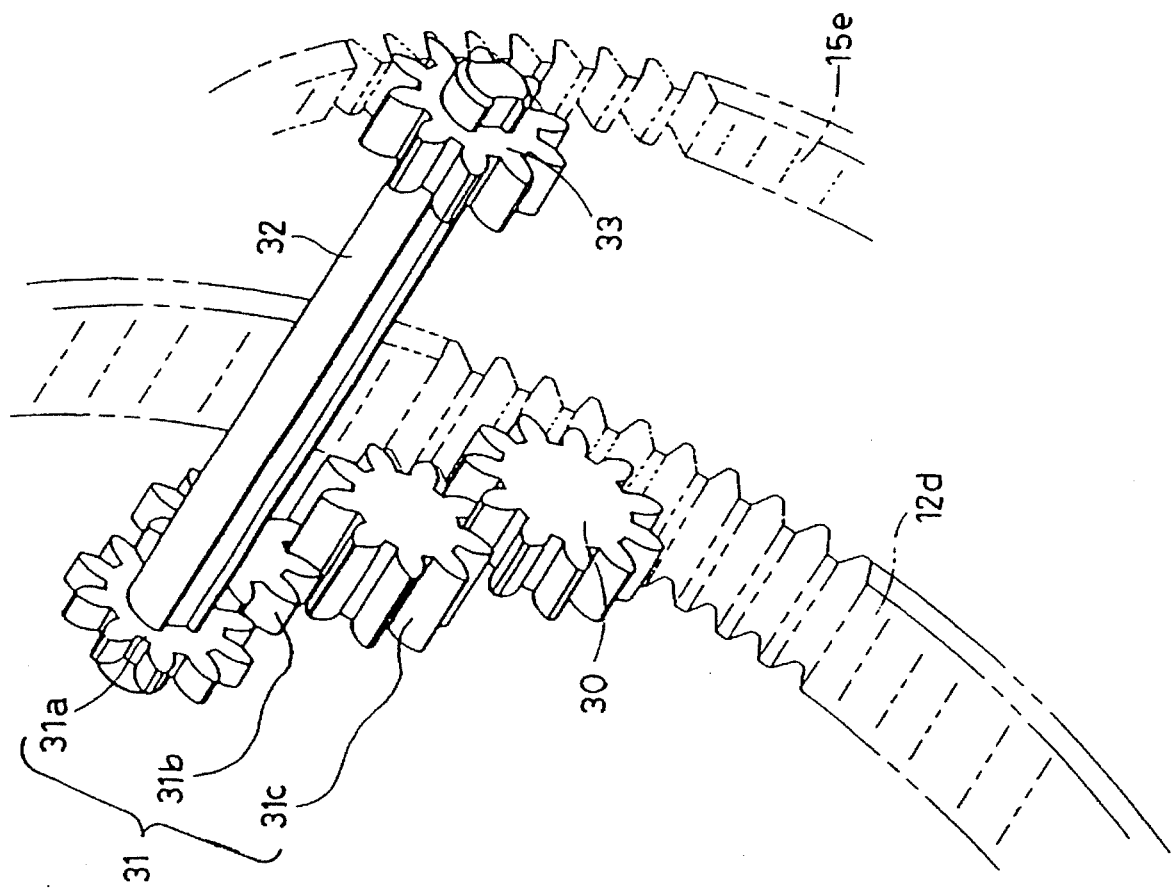
FIG. 6 is an isometric view of gears of the driving system shown in FIG. 5.

A pinion (i.e., second pinion) 33 is supported on the guide plate 17 fixed to the rear end surface of the guide member 16 in the vicinity of one of the keys 17a of the guide plate 17 as illustrated in FIG. 5. The pinion 33 fits on the shaft 32 such that the pinion 33 is slidable on the shaft 32 in the axial direction but does not rotate with respect to the shaft 32. In other words, the pinion 33 is movable with respect to the shaft 32 in the axial direction thereof and rotatable together with the shaft 32. Thus, the pinion 33 moves along the shaft 32 together with the guide plate 17 (and the second cylinder 15) when the second cylinder 15 moves in the optical axis direction. The pinion 33 meshes with a circumferential inner gear 15e which is formed on the inner surface of the second cylinder 15. Therefore, the rotation of the rotation cylinder 12 is transmitted to the second cylinder 15 through the inclined inner gear 12d, the pinion 30, the gear train 31, the rotation transmitting shaft 32, the pinion 33 and the circumferential inner gear 15e, regardless of the position of the first cylinder 14 in the direction of the optical axis.

The stiffness of portions adjacent to the guide keys 17a of the guide plate 17 is relatively high in comparison with the other portions of the guide plate 17. It is because the guide keys 17a are supported while always engaging the grooves 14d of the first cylinder 14. Since the pinion 33 is supported by the portion adjacent to one of the keys 17a of the guide plate 17 with high stiffness, the transmission shaft 32 engaging the pinion 33 is securely supported by the guide plate 17 through the pinion 33. As a result, the driving force transmitted to the pinion 30 is efficiently transmitted to the second cylinder 15 through the gear train 31, the transmission shaft 32 and the pinion 30.

In the zoom lens barrel with the above construction according to the present invention, when the rotation cylinder 12 is rotated, the first cylinder 14 moves in the direction of the optical axis and the second cylinder 15 rotates. The rotation of the second cylinder 15 allows the second cylinder 15 itself to move in the direction of the optical axis, and the front lens group L1 and the rear lens group L2 to linearly move while changing the distance between the two to thereby effect zooming.

With the construction of the driving device for the zoom lens barrel according to the present invention, the pinion is supported on the straight guide member adjacent to one of the straight keys thereof. As a result, the rotation shaft is securely supported and the loss of transmission efficiency of the driving force using the pinion supported on the rotation shaft is prevented.

We claim:

1. A driving device for a zoom lens barrel, comprising:

a movable cylinder linearly guided in the direction of an optical axis of a zoom lens;

a linear guide formed on said movable cylinder and extending in a direction parallel to said optical axis;

a rotation cylinder engaging said movable cylinder;

a guide member which is supported on said rotation cylinder, which rotates in relation to said rotation cylinder and which moves in said optical axis direction together with said rotation cylinder;

an engaging member formed on said guide member and engaging said linear guide of said movable cylinder;

a pinion rotatably supported on said movable cylinder;

a shaft driven to rotate by said pinion, wherein one end of said shaft is supported on said movable cylinder and an other end of said shaft is supported on said guide member, at least said one end or said other end being supported in a to be slidable manner in a direction parallel to said optical axis; and a second pinion for transmitting driving force to said rotation cylinder, wherein said second pinion fits on said shaft in a slidable manner in relation to said shaft to be slidable in an axial direction of said shaft, said second pinion rotatably supported on said guide member, and wherein said second pinion is supported on said guide member in a vicinity of said engaging member, and wherein a lens group of said zoom lens is moved in said optical axis direction by a rotation of said second pinion to change a focal length of said zoom lens.

2. The driving device for a zoom lens barrel of claim 1, wherein said shaft is supported on a supporting portion of said guide member so as to be slidable in a direction parallel to said optical axis in relation to said guide member.

3. The driving device for a zoom lens barrel of claim 1, wherein said shaft is supported on a supporting portion of said movable cylinder so as to be slidable in a direction parallel to said optical axis in relation to said guide member.

4. The driving device for a zoom lens barrel of claim 1, wherein said guide member is provided at a rear end thereof with a guide plate, and wherein said engaging member is formed on said guide plate and said second pinion is rotatably supported on said guide plate.

5. The driving device for a zoom lens barrel of claim 1, further comprising a gear supporting plate formed on a rear end of said movable cylinder and supporting said one end of said shaft.

6. The driving device for a zoom lens barrel of claim 1, further comprising a pair of gear supporting plates formed on a rear end of said movable cylinder and supporting said pinion between said pair of gear supporting plates.

7. A driving device for a zoom lens barrel, comprising:
- a movable cylinder linearly movable in a direction of an optical axis of a zoom lens and provided with a linear guide groove;
- a rotation cylinder rotatably fitted in said movable cylinder and provided with a circumferential gear;
- a movable member linearly moving in said optical axis direction and provided with a key engaging said linear guide groove;
- a pinion rotatably supported on said movable cylinder; and,
- a rotation transmitting shaft for transmitting a rotation thereof to said pinion, said pinion engaging said circumferential gear;

wherein said pinion is supported in a vicinity of said key.

8. A driving device for a zoom lens barrel, comprising:
- a first cylinder linearly movable in a direction of an optical axis of a zoom lens without rotating;
- a linear guide groove formed on an inner periphery of said first cylinder and extending in a direction parallel to said optical axis;
- a second cylinder engaging said first cylinder through helicoid gears in a rotatable manner with respect to said first cylinder;
- a guide member which is supported on an inner periphery of said second cylinder, which rotates with respect to said second cylinder and which moves in said optical axis direction together with said second cylinder;
- an engaging member formed on said guide member and engaging said linear guide groove;
- a pinion rotatably supported on said first cylinder;
- a shaft driven to rotate through said pinion, wherein one end of said shaft is fixed to said pinion, and wherein said shaft is supported on said guide member with said guide member slidable on said shaft in an axial direction of said shaft; and,
- a second pinion for transmitting a driving force to said rotation cylinder, wherein said second pinion fits on said shaft in a slidable manner with respect to said shaft in an axial direction of the shaft and rotates together with said shaft, said second pinion rotatably supported on said guide member in a vicinity of said engaging member.

* * * * *

UNITED STATES PATENT AND TRADEMARK OFFICE
CERTIFICATE OF CORRECTION

PATENT NO. : 5,535,057
DATED : July 9, 1996
INVENTOR(S) : H. NOMURA et al.

It is certified that error appears in the above-indentified patent and that said Letters Patent is hereby corrected as shown below:

At column 7, line 24 (claim 7, line 7), change "moving" to ---movable---.

Signed and Sealed this

Eighteenth Day of February, 1997

Attest:

BRUCE LEHMAN

Attesting Officer      Commissioner of Patents and Trademarks